UNITED STATES PATENT OFFICE.

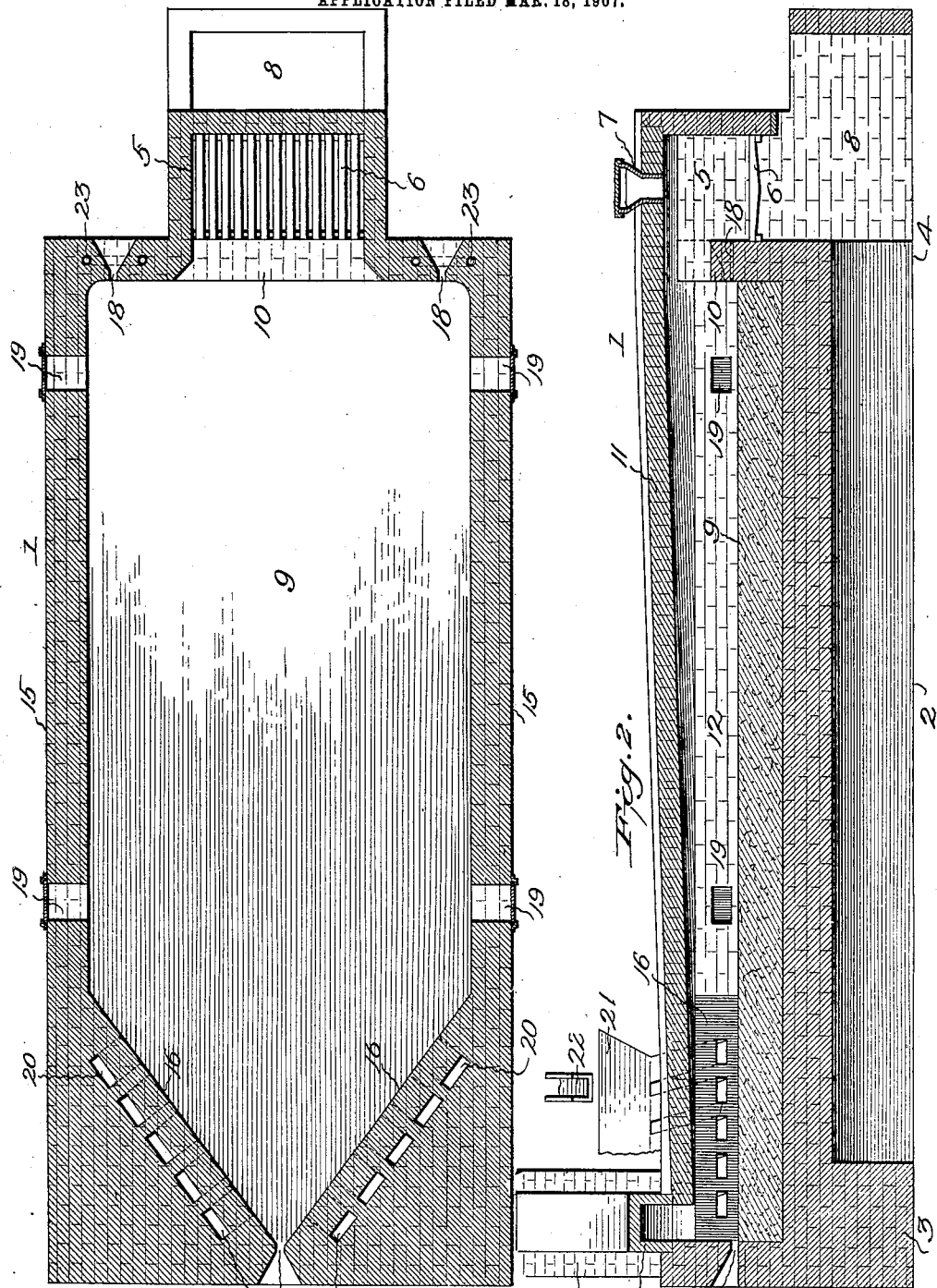

GEORGE GORDON VIVIAN, OF DENVER, COLORADO, ASSIGNOR OF ONE-HALF TO LAFAYETTE HANCHETT, OF SALT LAKE CITY, UTAH.

AUTOMATIC CONTINUOUS ORE-SMELTING PROCESS FOR REVERBERATORY FURNACES.

No. 862,683.      Specification of Letters Patent.      Patented Aug. 6, 1907.

Application filed March 18, 1907. Serial No. 363,067.

*To all whom it may concern:*

Be it known that I, GEORGE GORDON VIVIAN, a citizen of the United States of America, residing at the city and county of Denver and State of Colorado, have invented a new and useful Ore-Smelting Process for Reverberatory Furnaces, of which the following is a specification.

This invention relates to a process of smelting ores, the object of the invention being to provide an efficient and economical process of accomplishing this result.

According to my preferred procedure, the ore is fed, usually continuously, to a molten bath derived from the ore, and matte or metal and slag are continuously or intermittently tapped under conditions securing a high degree of efficiency of the process as hereinafter described.

My improved smelting process can be operated on a commercial scale in any suitably arranged reverberatory smelting furnace, but I have illustrated herewith a form of reverberatory smelting furnace which I have especially invented and adapted to practically and economically carry on the art of smelting of ores, in accordance with my process.

In the drawings illustrating my new furnace, Figure 1 is a horizontal, sectional view of my improved furnace, taken on a line above the hearth. And Fig. 2, is a vertical, longitudinal, sectional view, taken centrally through the same.

Similar letters of reference refer to similar parts throughout the several views.

In the present state of the art of smelting ores in reverberatory smelting furnaces, it is the practice to smelt ores in charges of predetermined amounts, weight, or measures, which charges are regulated to the capacity of the furnace in which the ore is to be smelted. These ore charges are fed intermittently to the furnace, as each charge is smelted, and the molten slag and matte or metals products of the smelting operation are drawn from the furnace intermittently as they accumulate to the operative capacity of the furnace; and the reverberatory smelting furnaces in use for smelting ores by the process at present in use, are arranged so that the slag is skimmed off through doors placed in the front and sides of the furnace, and these doors are sometimes used to feed ore to the hearth of the furnace. The feeding of the ore however, is most generally done through door-controlled openings in the roof of the furnace, from hoppers positioned above the openings, and the ore is fed in intermittent charges of large quantities, which fall into the molten slag with a splash and scatter the slag onto the inner surface of the hearth chamber, thus causing an immense amount of dusting, a large volume of which carrying values is carried up the chimney. The splashing of the hot slag against the walls of the hearth chamber causes them to rapidly deteriorate and to shrink or expand and to finally crack from the unequal heat, and in the usual process of smelting in reverberatory furnaces the slag is drawn off through tap-holes located at the furthest end of the furnace from the fire box, which is the coolest part of the furnace, or through doors in the sides of the furnace, in such a manner that the conditions are unfavorable to settling of the matte and the skimming off of the slag portion of the melted ore on the hearth, as when doors are used for this purpose, a large volume of cold air is admitted to the furnace, causing a chilling of the slag, and in a measure preventing a proper and free settling of the matte or metal values to the bottom of the slag, and along the bottom of the hearth, and the admittance of cold air to the slag-chamber causes rapid contraction and expansion and subjects the furnace to severe strains that cause its sides and roof to crack; and in the usual processes of smelting in reverberatory furnaces, the matte or liquid metals are drawn off through tap-holes located at the side or sides at about the center of the furnace.

My process contemplates a radically different treatment of the ore feeding, slag-tapping and matte-tapping elements of reverberatory smelting, and a new process or system and succession of operative steps of treatment that will prevent a loss of values by dusting, by imperfect settling of the matte, and by alternate cooling and heating, which also results in an unnecessary waste in fuel and in time.

In order to put my continuous ore feeding and smelting process into practical use, I have invented the furnace illustrated in the drawing, in which: the numeral 1, designates in general a reverberatory furnace adapted to successfully and economically operate my continuous ore feeding smelting process; 2, designates the foundation side walls; 3, the foundation rear end wall; and 4, the foundation head end wall.

5, designates the fire box. This fire box is made narrower in width than the body of the furnace, and is formed in the center of the width of the furnace, and is made of a length sufficient to receive a grate surface of sufficient capacity for the size of the furnace.

6 designates the fire grate; 7, is a coal entrance hopper in the roof of the fire box, and below the fire box an ash pit 8 is formed. A hearth 9, which may be constructed of any suitable material and may be arranged in any desired manner, is formed on the foundation walls 2 and 3 and 4. A fire bridge wall 10, is formed between the fire box and the end of the furnace. This bridge wall is a vertical extension of the rear end wall above the end of the hearth, and extends beyond the fire box, and with the foundation wall 3 forms the rear end of the furnace. The foundation walls 2 and 3 and 4 extend above the hearth, and are integrally formed, and a roof 11 extends integrally from the sides and ends over the hearth, thus forming a hearth or molten ore chamber 12 above the hearth. At the front end of the furnace a flue 13 connects with a chimney 14, which extends from one corner of the front end of the furnace.

I make the shape of the hearth of the furnace with a square end at the fire box end, and with straight parallel sides 15, to near the front end portion of the furnace, from which point the sides converge into straight angular walls 16, that meet at the center of the front end of the furnace, and a matte or metal tap-hole 17 is formed through the front end wall. This tap hole is placed on a level with the bottom of the hearth, and at the fire-box or rear end wall of the hearth I place one or more slag tap-holes 18, preferably using two and placing them one on each side of the fire-box. These slag tap holes are placed a trifle above the bottom of the hearth so as to drain the upper portion of the body of molten slag lying on the hearth. The roof of the furnace is made solid and without openings of any kind, and the sides of the furnace are also preferably made solid except that two entrance doors 19 are placed in each side. These side doors I employ to allow the operator to watch the smelting operation, and to keep the inside entrances of the slag tap-holes in good order, as they require occasional repairing to prevent their being burned out too large in diameter to properly keep the slag under control.

In the side walls 16 of the angled front end portion, I form ore feeding chutes 20, in the form of oblong apertures, which stand at an outward inclined angle from where they enter the furnace. I preferably arrange these feed chutes to extend along the greater portion of the length of these angled walls from the point where they intersect the side walls to near the apex or front end of the furnace where they come together. These oppositely-disposed ore feed chutes could be each made in one long narrow aperture or slot, but in order to insure the greatest strength of wall I preferably form two or three or more ore chute apertures, five being illustrated, at a short distance apart, and leave an integral portion of the wall as a partition between them to support and tie the hearth face portion of the wall to the outside portion of the side and end walls. These ore feeding chutes extend down through the side walls of the furnace, to or close to the floor of the hearth, and in their top entrances I fit the discharging ends of a pair of ore feed hoppers 21, which are connected by launders 22 with ore storage bins, which I do not illustrate.

Smelting ore consisting of concentrates from jigs and concentrating tables varying from about one-quarter inch mesh down to about a hundred and even finer mesh, make up a large part of the character of size of the ore product usually smelted in reverberatory furnaces, and all kinds of smelting ore that is shipped direct from the mine, which when in large lumps passed through rock breakers and is reduced to small pieces, in which form it is easily fed through the hoppers and chutes to the hearth after being first mixed with proper fluxes when they are required.

My new smelting process contemplates the gentle and slow feeding of ore to the furnace without any agitation or movement of the ore that would raise its dust particles into the draft current flowing from the fire box to the chimney; the hoppers are preferably provided with ore enough to keep the feed chutes in the opposite angular walls of the head end of the slag chamber full at all times. These ore chutes are adapted in area to feed and discharge ore continuously onto the molten body of ore on the hearth without allowing it to drop, and the slag tap holes and also the matte or metal tap hole is adapted to be continuously open in all cases where the ore smelts quickly and readily, and it is necessary to feed fast in order not to allow the slag to lie any longer on the hearth than is necessary for it to arrive at the degree of the heat necessary to reduce it to that degree of fluidity necessary to allow all of the ore's metallic values to separate from its slag element and easily and thoroughly settle out of the slag, and form the lower stratum of the molten ore body along the floor or hearth of the furnace. But when complex or refractory ores are smelted and the feed though continuous is slow, it may not be desirable or necessary to keep the slag and matte tap-holes open all of the time, but it will be sufficient to open them as required at intervals, as is customary. But on ores that contain but little value and a large amount of slag, it might be necessary to keep the slag tap open continuously and draw off the matte at intermittent periods when a sufficient quantity has accumulated. The slow easy continuous flowing feed movement of the ore at the front end of the hearth directly on top of and into the body of molten ore prevents the fine dust particles of the ore from getting into the flame and heat and products of combustion draft that flows constantly and with considerable force from the fire box to the chimney over the molten ore-slag and thus completely and thoroughly eradicates this particular element of loss of values from the economic value of my furnace. This method of feeding ore directly onto and into the body of molten ore completely eliminates the splashing of the molten slag and matte against the sides of the hearth or slag chamber, and also completely avoids the admittance of cold air into the hearth chamber from the opening of doors, as in the most advanced and perfected type of reverberatory furnaces in use at the present time. The elimination of doored openings into the furnace both for recharging and for withdrawing or discharging or skimming slag from it, or for leveling, is a feature of great economic value in the saving effected in the cost of fuel and in the time required to regain the heat lost, as it is easy to maintain an even temperature where no cold air is admitted; and the deleterious action on the molten ore due to frequent chillings is thus avoided, and the cost of labor and the wear and tear of the furnace is greatly reduced, making altogether an item representing a saving of from about ten to twenty-five per cent. in the cost of treatment and higher extraction of values, which when coupled with a large increased capacity of my automatic feed over intermittent manual feeding establishes a far greater degree of utility, practicability, and economic value for my improved reverberatory smelting furnace over all other reverberatory furnaces known to the art of smelting ores.

In order to protect the slag and matte-tap outlet apertures from the intense heat of the interior of the furnace, and scouring effect of the molten ore, I place in the walls of the furnace a water jacket which may be of any suitable construction for this purpose, preferably illustrating a water carrying coil of pipe 23, which at one end extends from a supply of cold water and enters the wall adjacent to a tap-hole and extends around the tap-hole and then at its opposite end extends out of the furnace and leads to waste.

The operation of my continuous ore feeding smelting process is as follows: The ore is fed into the hoppers of the furnace from a source of supply, and it flows freely into the feed chutes, which are preferably kept full of ore and the ore feeds by gravity into the body of molten slag which is preferably several inches deep on the hearth, at the front end of the furnace, and the ore feeds of its own weight through the ore chutes onto and into the body of molten ore moving slowly and gently into it only as fast as it melts, and as the feed chutes are positioned at the front end of the furnace, at which point is the coolest part of the body of molten slag, it does not disturb or cool the hottest portion of the molten ore, which is at the fire box or back end of the furnace, and as the ore melts it flows towards the fire box end of the furnace and is heated hotter and hotter, and the metals settle to the bottom of it along the floor portion of the hearth, as matte or metal which is the collected fluid metals of all kinds in the ore, and this matte flows along under the top stratum of the melted ore which is the slag portion, and consists of the fluid earthy matter in the ore, to the matte tap hole at the front or feed end of the furnace, while the hot slag is drawn off through the slag tap holes at the fire box end of the furnace, and as the slag at this end of the furnace is in the hottest zone of the furnace, it is of clearer fluidity and consequently the metals of the ore settle out of it more readily and quicker and more thoroughly than out of the cooler portions of the molten ore slag, while the slag is clear and free from the metals or matte and carries less values away than in furnaces where the slag is drawn off through front and side doors that admit chilling air to the interior of the hearth chamber. Moreover, the flame and products of combustion of the fire box in flowing from the fire box to the chimney flue come in contact with the ore as it flows into the hearth chamber onto the molten ore body, and heats it and thereby aids in melting it and to that extent increases the smelting capacity of the furnace.

I have described quite fully the arrangement and action of my new furnace and its operative action in carrying out my process, but I want it understood that my present invention contemplates the adaptation of my process to any suitable type or character of a smelting furnace.

The furnace described herein creates three distinct zones, two of which do not exist in the type of furnace at present employed. These zones are the sintering or agglomeration zone, which is located at the point where the ore as it feeds continuously into the furnace is engaged by the products of combustion flowing from the fire-box to the chimney flue, which causes a softening or cementing action to take place in the ore, as the ore feeding in such a thin slowly moving body is highly heated up, softened, and cemented by the hot walls of the flues it flows through, and on entering and spreading out in a thin layer over the molten ore body as it flows onto it. In case the character of the ore is such that the softening or cementing action would tend to clog the feed-openings, manual stoking is resorted to in order to keep these clear. The next zone is the smelting zone, which is positioned at the center of the furnace. This zone exists in the furnaces in common use, but as the ore is dumped into the furnace in a heap that forms a hill of ore in the furnace, the best smelting conditions are not realized. The third zone is the separating, cleansing, and settling zone, which is positioned at the bridge wall and fire-box end of the furnace. This zone while present in the furnaces now in use is not taken advantage of to secure the advantages which it naturally offers, of obtaining a very much higher character of separation between the slag and matte elements of the molten ore, and the cleansing and purifying of the slag of deleterious elements. As in the furnaces now in use, both the slag and the matte are drawn off at the sides of the central portion of the furnace zone, which is the smelting zone portion. This separating, cleansing, and settling zone is the very hottest portion of the furnace, and as the molten ore from the time it melts in the smelting zone flows towards it from the smelting zone, where the ore melts, and when it melts the slag and metals elements are thoroughly intermixed, and they only commence to separate as the ore grows hotter and hotter, which it does in my furnace as it flows towards the fire box end of the furnace, because it is drawn off at that end and is continuously discharging at that end on some ores; consequently when it reaches this hottest zone it is in a boiling condition and is kept in a boiling condition at this fire box zone of the furnace, and this boiling condition causes the heavy metals in the molten ore to separate from the slag element and settle out of it; it also permits chemical agents to be added at this point through the side door to cleanse the slag. This cleansing and separating treatment is given in the present practice of reverberatory smelting by drawing off the slag at the middle of the furnace, and immediately running it into another smaller reverberatory furnace, and resmelting the slag, in which treatment they add chemical agents to cleanse the ore and to settle the matte or metals in it; thus showing that the first smelting treatment is imperfect, and not at all satisfactory in recovering the matte or metal values; while with my new process and furnace a perfectly satisfactory separation of the matte or metal values can be obtained by one continuous operation.

A personal practical experience in smelting ore in reverberatory smelting furnaces in Swansea, Wales, prior to 1873, and in the United States and Mexico from 1873 down to the present time, has demonstrated that the present process and system of smelting ore in reverberatory furnaces can be very greatly improved in the percentage of values recovered and the expense per ton of smelting, and in the increase in capacity of the furnaces at present in use. Thus, when ore is fed in fixed charges to a furnace either through doored openings in the roof or sides, the furnace is opened for the admittance of cold air, which cools it off and cools the melted ore off and requires an extra amount of fuel to bring the furnace back to its proper heat, besides a loss in time for completing the smelting operation.

The falling of ore which from its nature is heavy, through the roof of a furnace, or the throwing of it through the doors of a furnace, causes it to fall with a splash into the body of molten ore on the hearth of the furnace, scattering it against the walls and roof of the furnace, and the ore being invariably cold, chills the molten ore, and interferes with the proper settling of the matte or metals element of the molten ore; and furthermore, being fed in a body into the accumulating molten body of ore on the hearth of a furnace, it piles up in the ore chamber and separates the ore body and thereby prevents the easy flow of the matte to the matte tap hole and of the slag to the slag tap holes. The slag and matte is allowed to accumulate on the hearth of the furnace, and the slag which forms the top or upper element of the molten ore and accumulates much faster than the matte, is drawn off at intervals of a few hours, as the conditions may warrant, while the matte or metals, which forms the bottom stratum of the molten ore, is slow in accumulating, and sometimes under the methods at present in use is allowed to accumulate for several days or a week or two, thus allowing it to stand in a burning state for a very long period of time after it has separated from the slag and is ready to leave the furnace, which practice entails a percentage loss by volatilization by the extremely high heat used to melt the ore, which rapidly volatilizes the deleterious products, which are present in ores, and as these elements such as sulfur, antimony, bismuth, zinc, and others, are associated with the precious metals and form a menstruum for them, the practice of allowing them to remain for so long periods of time in the furnaces tends to a loss of them from the affinity these metals have for these volatile elements; again, the molten ore is in a boiling condition at the fire box end of a reverberatory smelting furnace, and this boiling or ebullition action of the molten ore tends to hold the matte up in suspension in the slag and allows the slag to work down to the bottom of the matte, and keeps both slag and matte mixed up together at this and the adjacent portion of the furnace; yet it is the present practice to draw off or skim off the slag through doors positioned at points where from the high heat of the part of the furnace the matte has not thoroughly settled from it, and consequently more or less matte or metals are drawn with the slag and thrown on the slag dump and lost. It is a fact well known to the art of smelting that the matte should be kept as cold as possible, and yet be in a fluid state, and it often happens in the modern practice that in drawing off matte from the central portion of furnaces where it is very hot, the flow of the matte can not be checked and flows on over the floor of a plant, and the operator is powerless to check its flow until the furnace is practically drained, working disaster to the smelting operation, as it is very essential to keep a body of molten ore slag and matte on the furnace, and it has been the desideratum of the reverberatory smelting art to find some way in which the matte could be kept colder than the slag and cold enough to be always under the instant control of the operator; consequently my process consists of drawing off the top stratum of the molten ore, which is the slag at the very hottest part of the furnace, where it is in the thinnest liquid form, and of drawing off the lower stratum of the molten ore, which is the matte or metals, such as gold, silver, lead, and copper, at the very coldest end of the furnace where it is in its thickest and purest but still in fluid condition.

The reverberatory smelting furnaces in use can be easily and cheaply reconstructed and arranged to operatively smelt ores in accordance with my method; and such reconstruction would greatly increase their capacity and yield a higher extraction of values from the ores treated by them, and at a reduced cost per ton for smelting treatment charges.

Having described my invention, what I claim as new and desire to secure by Letters Patent, is:

1. The process which consists in passing heated gases over a molten bath and thereby subjecting the same to unequal temperature conditions, supplying ore to the cooler portion of said bath, and withdrawing slag from the hotter portion of said bath.

2. The process which consists in passing heated gases over a molten bath and thereby subjecting the same to unequal temperature conditions, supplying ore in a substantially continuous manner to the cooler portion of said bath, and withdrawing slag from the hotter portion of said bath.

3. The process which consists in passing heated gases over a molten bath and thereby subjecting the same to unequal temperature conditions, supplying ore to the cooler portion of said bath, withdrawing metal or matte from said cooler portion, and withdrawing slag from the hotter portion of said bath.

4. The process which consists in passing heated gases over a molten bath and thereby subjecting the same to unequal temperature conditions, supplying ore in a substantially continuous manner to the cooler portion of said bath, withdrawing metal or matte from said cooler portion, and withdrawing slag from the hotter portion of said bath.

5. The process which consists in providing a molten bath comprising superposed bodies of metal or matte and slag, passing heated gases over said bath and thereby subjecting the same to unequal temperature conditions, feeding ore to said bath at a point remote from the source of heat, and withdrawing slag at a point adjacent said source of heat.

6. The process which consists in providing a molten bath comprising superposed bodies of metal or matte and slag, passing heated gases over said bath and thereby subjecting the same to unequal temperature conditions, feeding ore to said bath and withdrawing metal or matte therefrom at a point remote from the source of heat, and withdrawing slag at a point adjacent said source of heat.

7. The process which consists in passing heated gases over a molten bath and thereby subjecting the same to unequal temperature conditions, supplying ore to the cooler portion of said bath without substantial agitation thereof, and withdrawing slag from the hotter portion of said bath.

8. The process which consists in passing heated gases over a molten bath and thereby subjecting the same to unequal temperature conditions, supplying ore to the cooler portion of said bath without substantial agitation thereof, and withdrawing metal or matte from said cooler portion.

9. A smelting process for reverberatory furnaces, which consists of first feeding ore continuously in a slow, gentle, flowing stream directly into and directly onto the hearth of reverberatory smelting furnaces, then tapping the slag product of the ore from the hottest end portion of the hearth of said furnaces, and then tapping the matte or metals portion of said ore from the coolest end portions of the hearths of said furnaces.

10. An automatic smelting process for reverberatory smelting furnaces, which consists of feeding ore continuously to the coolest end portion of reverberatory smelting furnaces, in such a manner that said ore flows in a steady, gentle stream directly onto and into the body of molten ore on the hearths of reverberatory smelting furnaces, then distributing said ore in such a manner that the ore is engaged and sintered by the products of combustion flowing from the fire box to the chimney of said furnace, then withdrawing the slag element of the molten ore of said furnace from the hottest or fire box end of said furnace, and then withdrawing the matte or metals portion of said molten ore from the coolest end portion of said furnace.

11. An automatic continuous process for smelting ore in reverberatory furnaces, which consists of continuously flowing ore to the molten ore body on the hearth of a reverberatory furnace, then drawing the slag product of said molten ore from the hottest or fire box end of the hearth of said furnace, and then drawing the matte or metals from the coolest end of the hearth of said furnace.

12. An automatic continuous process for smelting ore in reverberatory furnaces, consisting of first flowing ore in a gently flowing continuous stream in contact with the products of combustion from the fire box of a reverberatory furnace, thereby subjecting said ore to a sintering action, and at the same time feeding the ore gently onto and into the body of molten ore on the hearth of said reverberatory furnaces, then drawing the slag product of the body of molten ore continuously from the hottest or fire-box end of said furnace, then drawing the matte or metals portion of the molten ore body continuously from the coolest end of the hearth of reverberatory furnaces.

13. The herein-described process of smelting ore in reverberatory smelting furnaces, which consists of first feeding ore in a continuous stream into the coolest end portion of reverberatory furnaces into engagement with the products of combustion, in such a manner as to impart a sintering or agglomeration action to the ore, then flowing the ore into the smelting zone of the furnace and smelting said ore, then flowing said smelted ore continuously onto the cleansing and settling zone of said furnaces, then continuously or intermittently drawing the slag element from the smelted ore from the hottest or fire-box end of said furnaces, then continuously or intermittently drawing the matte or metals of said smelted ore from the coldest end portion of said reverberatory furnaces.

In testimony whereof I affix my signature in presence of two witnesses.

GEORGE GORDON VIVIAN.

Witnesses:
   G. SARGENT ELLIOTT,
   ADELLA M. FOWLE.